April 5, 1927.
L. H. FERGUSON
1,623,914
COMBINED TIRE CARRIER AND RIM REMOVER
Filed March 1, 1924
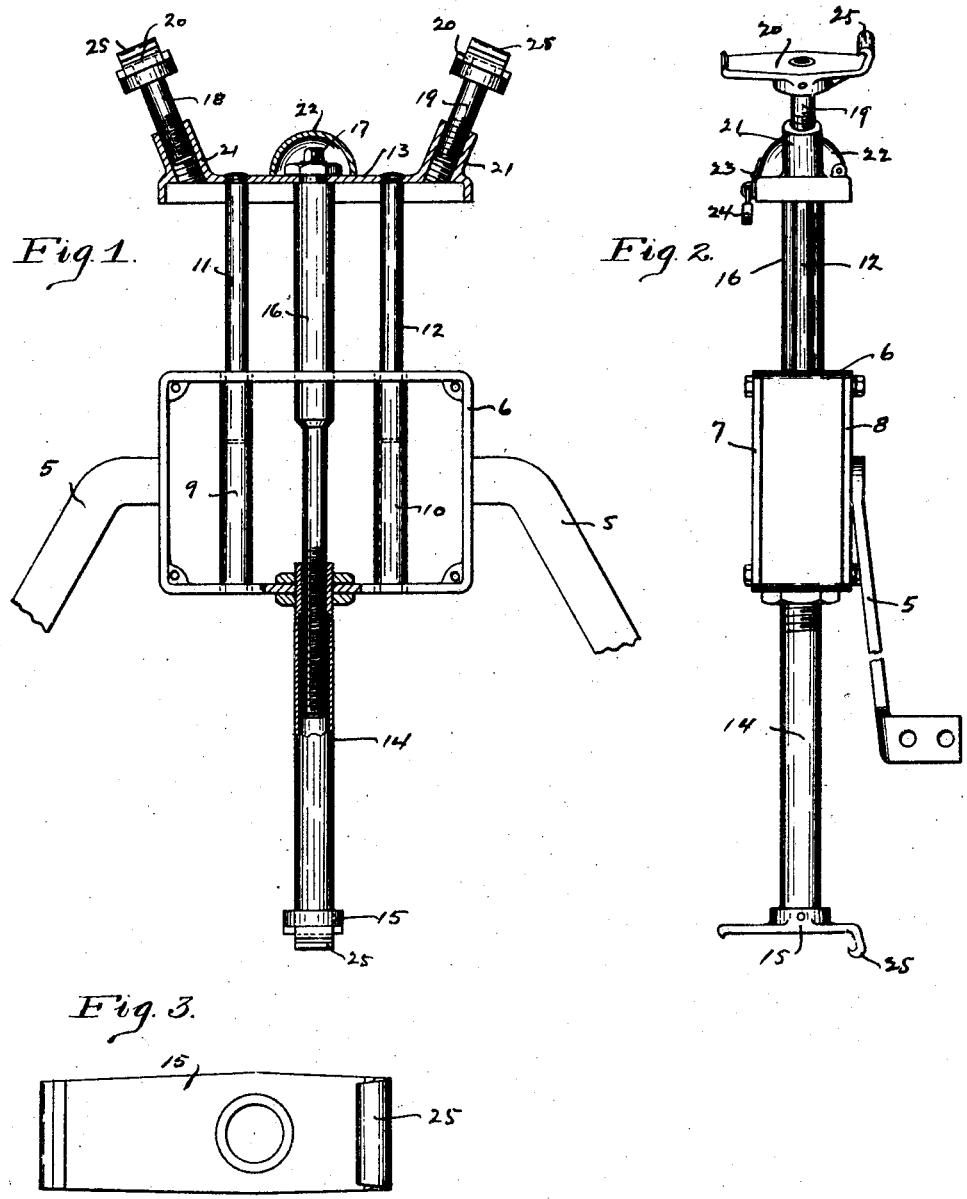
Inventor
Lyman H. Ferguson
by J. Wm. Ellis
Attorney.

Patented Apr. 5, 1927.

1,623,914

UNITED STATES PATENT OFFICE.

LYMAN H. FERGUSON, OF ITHACA, NEW YORK, ASSIGNOR TO J. WILLIAM ELLIS, OF BUFFALO, NEW YORK.

COMBINED TIRE CARRIER AND RIM REMOVER.

Application filed March 1, 1924. Serial No. 696,364.

My invention relates generally to a device for conveniently changing the tires of an automobile, and more particularly to a device which may be used for removing an automobile tire from the rim, or placing an automobile tire upon a rim, and of such a construction that the device may be employed for the purposes stated either in a garage or upon an automobile.

By means of the device herein shown and described, a disabled automobile tire may be very quickly and easily removed from its rim and another tire placed upon the same rim, whether such change becomes necessary while on the road or in a garage.

In producing my invention, I have sought, and have provided, means, which are simple, inexpensive to manufacture, and capable of easy use for the purposes stated. In fact my device is so easily understood and operated that one with but the slightest knowledge of tires and rims could readily use it.

If the device is employed only in a garage for the purpose of removing tires from rims, or placing tires upon them, it may be supported either on the side wall of the garage, or on some suitable standard provided for that purpose. If my device is used upon an automobile, it may be suitably mounted in any convenient place upon the automobile (preferably at the rear thereof), and when so employed, it may be used not only to mount and demount tires from rims, but also as a carrier for spare tires. Moreover, as will be hereinafter seen, the device may be employed for carrying more than one tire when desired.

Many other advantages than those hereinbefore related will be evident to those skilled in the art.

Referring now to the drawings:

Fig. 1 is a front elevation, partly in section, of my invention.

Fig. 2 is a side elevation thereof.

Fig. 3 is an enlarged plan view of one of the rim engaging members carried by my device.

In the drawings 5 represents any suitable support for my device, and 6 is the body or housing to which the support 5 is preferably secured by any suitable means. Plates 7 and 8 are bolted or otherwise suitably secured to the housing for inclosing the same. Carried within the housing are guiding members 9 and 10, which are preferably hollow and each one secured at its top and bottom to the top and bottom of the housing. Guide rods 11 and 12 are suitably secured to a movable yoke 13.

An arm 14 is secured in any desired way to the bottom wall of the housing 6 and extends downwardly therefrom. This arm is preferably hollow, and at its upper end is interiorly screw-threaded. At the lower end of the arm 14 is carried a rim engaging member 15. An adjusting screw 16 passes freely through an aperture in the upper wall of the housing 6 and is preferably exteriorly threaded at its lower end so that the threads will engage with the interior threads of the arm 14. The upper end of the screw 16 is rotatably mounted in the yoke 13 and at its upper end is provided with a portion 17 so formed as to be easily actuated by means of a wrench or other similar tool. Carried by the yoke 13 are two studs 18 and 19, each of which is provided at its outer end with a rim engaging member 20. Each of these studs is preferably mounted within a hollow interiorly screw-threaded projection 21 formed on the yoke 13, and each of the studs is provided with threads to engage with the threads of the projections 21. Thus each of the studs may be adjusted as to its longitudinal extension outwardly from the projections 21, and each of the rim engaging members carried by the studs may be free to slightly rotate when the device is being used.

If desired, a suitable cap 22 may be pivotally carried by the yoke 13, and mounted over the top of the portion 17 of the screw 16. When the cap is in the position shown in the drawings, a suitable clamp 23 may be used together with a padlock 24 for securely locking the device to prevent any actuation of the screw by an unauthorized person.

The rim engaging member is so formed that the flat part of the rim will seat upon the flat part of the rim engaging member and the hook portion 25 of the member is adapted, when placed in position to engage with the outer edge of the rim flange so that when the rim engaging member is drawn inwardly, it will firmly grip the rim and thereby contract it.

In using my device for a rim remover, or rim replacer, whether the device is used in the garage or suitably mounted on some part of an automobile, a wrench or other convenient tool, preferably of the ratchet type, may be used to rotate the screw 16 by its engagement with the portion 17. The revolution of the screw 16 will either draw the rim engaging members 20 downwardly toward the body 6, or force them outwardly away from such body. If it is desired to remove a tire from a rim, the screw is so rotated that the hook portions 25 of the rim engaging members 15 and 20 are gripped over the outer edge of the flange of the rim. The rim engaging member 15 is preferably positioned substantially opposite the transverse split of the standard split rim while the rim engaging members 20 are preferably placed on opposite sides of such transverse split.

The hook portions being in the position described, the tool is then operated to rotate the screw 16 in a direction to draw the yoke 13 downwardly toward the body 6, and thereby contract the rim so that the tire may be removed therefrom.

After removing the tire, as described, another tire, or the repaired tire may then be placed upon the contracted rim leaving the rim engaging members in the position above related. The screw 16 is then rotated in the opposite direction from that first described until the rim engaging members have expanded the rim to the point where the ends of the rim formed by the transverse split abut each other in the necessary registering position, where they may be lockingly engaged.

It is obvious that my device may be used in the same way whether in a garage or upon an automobile. As hereinbefore pointed out, when my device is used on an automobile, as described, it may be employed not only for the purposes above related but it may also be used for carrying spare tires and rims. When it is desired for such use, it is only necessary that the screw 16 be so adjusted that the rim engaging members will be forced into strong frictional engagement with the interior periphery of the rim.

If it is desired to carry more than one spare tire and rim, it is obvious that the rim engaging members may be duplicated or enlarged so as to carry two or more rims instead of only one as illustrated in the drawings herein.

Obviously, some modifications of the details herein shown and described may be made without departing from the spirit of my invention, or the scope of the appended claims, and I do not, therefore, wish to be limited to the exact embodiment herein shown and described, the form shown and described being merely a preferred form thereof.

Having thus described my invention, what I claim is:

1. A combined tire carrier and rim remover comprising a body, a rigid arm carried by and extending from the body and provided at its lower end with a rim engaging member, a yoke slidably carried by the body, a plurality of rim engaging members carried by the yoke, screw means rotatably carried by the yoke and engaging the rigid arm for moving the yoke toward and away from the body, and means carried by the body, and the yoke for guiding the travel of the yoke.

2. A combined tire carrier and rim remover comprising a body, a rigid arm carried by, and extending from the body and provided at its lower end with a rim engaging member, a yoke slidably carried by the body, a plurality of rim engaging members carried by the yoke, a screw rotatably carried by the yoke and engaging the rigid arm carried by the body for moving the yoke.

3. A combined tire carrier and rim remover comprising a body, a rigid arm carried by and extending from the body and provided at its lower end with a rim engaging member, a yoke slidably carried by the body, a plurality of rim engaging members rotatably mounted on the yoke, and a screw rotatably carried by the yoke and engaging the rigid arm carried by the body for moving the yoke.

4. A combined tire carrier and rim remover comprising a body, a rigid arm carried by and extending from the body and provided at its lower end with a rim engaging member, a yoke slidably carried by the body, studs rotatably carried by the yoke, a rim engaging member carried by each stud, and a screw rotatably carried by the yoke and engaging the rigid arm carried by the body for moving the yoke.

5. In combination with a motor vehicle, of a combined tire carrier and rim remover carried thereby, comprising a body, a rigid arm carried by and extending from the body and provided at its lower end with a rim engaging member, a yoke slidably carried by the body, a plurality of rim engaging members carried by the yoke, a screw rotatably carried by the yoke and engaging the rigid arm carried by the body for moving the yoke.

6. A combined tire carrier and rim remover comprising a stationary member, a movable member, and means for operating the movable member, the stationary member comprising a body and a rigid tire engaging means, the movable member comprising a yoke slidably carried by the body and a plurality of axially rigid rim engaging means, and the means for operating the movable member comprising a screw rotatably carried by the yoke and engaging the rigid arm carried by the body for moving the yoke.

In testimony whereof, I have hereunto signed by name.

LYMAN H. FERGUSON.